United States Patent
Stockman et al.

(10) Patent No.: US 10,147,549 B2
(45) Date of Patent: *Dec. 4, 2018

(54) POWER FACTOR CORRECTION CAPACITORS

(71) Applicant: American Radionic Company, Inc., Palm Coast, FL (US)

(72) Inventors: Robert M. Stockman, Palm Coast, FL (US); Richard W. Stockman, Ormond Beach, FL (US); Michael B. Tricano, Ormond Beach, FL (US); Jonathan Charles, Ormond Beach, FL (US)

(73) Assignee: American Radionic Company, Inc., Palm Coast, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/705,787

(22) Filed: Sep. 15, 2017

(65) Prior Publication Data

US 2018/0090278 A1  Mar. 29, 2018

Related U.S. Application Data

(63) Continuation of application No. 15/276,129, filed on Sep. 26, 2016, which is a continuation of application
(Continued)

(51) Int. Cl.
*H01G 4/38* (2006.01)
*H01G 4/32* (2006.01)
(Continued)

(52) U.S. Cl.
CPC ............... *H01G 4/38* (2013.01); *H01G 2/106* (2013.01); *H01G 4/012* (2013.01); *H01G 4/224* (2013.01);
(Continued)

(58) Field of Classification Search
CPC .......... H01G 4/012; H01G 4/32; H01G 4/224; H01G 4/385; H01G 4/232; H01G 4/238
See application file for complete search history.

(56) References Cited

U.S. PATENT DOCUMENTS

| 1,665,499 A | 4/1928 | Hoch |
| 1,707,959 A | 4/1929 | Fried |

(Continued)

FOREIGN PATENT DOCUMENTS

| CA | 2285721 | 4/2000 |
| EP | 1115128 | 7/2001 |

(Continued)

OTHER PUBLICATIONS

Defendants' First Supplemental Disclosure of Non-Infringement and Invalidity Contentions *American Radionic, Inc.*, v. *Packard, Inc., and Cornell-Dubilier Electronics, Inc.*, No. 6:14-cv-01881-RBD-KRS.

(Continued)

*Primary Examiner* — Nguyen T Ha
(74) *Attorney, Agent, or Firm* — Fish & Richardson P.C.

(57) ABSTRACT

An apparatus includes a case capable of receiving a plurality of capacitive elements, each capacitor element having at least two capacitors, and each capacitor having a capacitive value. The apparatus also includes a cover assembly with a peripheral edge secured to the case. The cover assembly includes, for each of the plurality of capacitive elements, a cover terminal that extends upwardly from the cover assembly generally at a central region of the cover assembly. Each cover terminal is connected to one of the at least two capacitors of the respective one of the plurality of capacitive elements. The cover assembly also includes, for each of the plurality of capacitive elements, a cover terminal that extends upwardly from the cover assembly at a position (Continued)

spaced apart from the cover terminal generally at the central region of the cover assembly.

26 Claims, 8 Drawing Sheets

Related U.S. Application Data

No. 14/663,620, filed on Mar. 20, 2015, now Pat. No. 9,496,086, which is a continuation of application No. 14/283,960, filed on May 21, 2014, now Pat. No. 9,318,261.

(60) Provisional application No. 61/825,850, filed on May 21, 2013.

(51) Int. Cl.
  *H01G 2/10* (2006.01)
  *H01G 4/236* (2006.01)
  *H01G 4/224* (2006.01)
  *H01G 4/012* (2006.01)
  *H01G 4/232* (2006.01)
  *H01G 4/228* (2006.01)

(52) U.S. Cl.
  CPC ............ *H01G 4/228* (2013.01); *H01G 4/232* (2013.01); *H01G 4/236* (2013.01); *H01G 4/32* (2013.01)

(56) References Cited

U.S. PATENT DOCUMENTS

| | | | |
|---|---|---|---|
| 1,943,714 | A | 1/1934 | Bailey |
| 2,202,166 | A | 11/1937 | Peck |
| D122,825 | S | 10/1940 | Peck |
| D124,726 | S | 1/1941 | Shimer |
| 2,569,925 | A | 12/1948 | Deeley |
| 2,896,008 | A | 12/1953 | Putz |
| 3,015,687 | A | 11/1959 | Ruscito |
| 3,302,081 | A | 1/1967 | Grahame |
| 3,304,473 | A | 2/1967 | Netherwood et al. |
| D210,210 | S | 2/1968 | Braiman et al. |
| 3,377,510 | A | 4/1968 | Rayno |
| 3,921,041 | A | 11/1975 | Stockman |
| 3,988,650 | A | 10/1976 | Fritze |
| 4,028,595 | A | 6/1977 | Stockman |
| 4,095,902 | A | 6/1978 | Florer et al. |
| 4,106,068 | A | 8/1978 | Flanagan |
| 4,107,758 | A | 8/1978 | Shim et al. |
| 4,112,424 | A | 9/1978 | Lapeyre |
| 4,209,815 | A | 6/1980 | Rollins et al. |
| 4,240,126 | A | 12/1980 | Sanvito |
| 4,263,638 | A | 4/1981 | Stockman et al. |
| 4,312,027 | A | 1/1982 | Stockman |
| 4,326,237 | A | 4/1982 | Markarian et al. |
| 4,352,145 | A | 9/1982 | Stockman |
| 4,363,078 | A | 12/1982 | Dwyer |
| 4,398,782 | A | 8/1983 | Markarian |
| 4,408,818 | A | 10/1983 | Markarian |
| 4,420,791 | A | 12/1983 | Shedigian |
| 4,447,854 | A | 5/1984 | Markarian |
| 4,459,637 | A | 7/1984 | Shedigian |
| 4,486,809 | A | 12/1984 | Deak et al. |
| 4,558,394 | A | 12/1985 | Stockman |
| 4,586,107 | A | 4/1986 | Price |
| 4,609,967 | A | 9/1986 | Shedigian |
| 4,621,301 | A | 11/1986 | Shedigian |
| 4,631,631 | A | 12/1986 | Hodges et al. |
| 4,633,365 | A | 12/1986 | Stockman |
| 4,633,367 | A | 12/1986 | Strange et al. |
| 4,633,369 | A | 12/1986 | Lapp et al. |
| 4,639,828 | A | 1/1987 | Strange et al. |
| 4,642,731 | A | 2/1987 | Shedigian |
| 4,698,725 | A | 10/1987 | MacDougall et al. |
| 4,754,361 | A | 6/1988 | Venturini |
| 4,812,941 | A | 3/1989 | Rice et al. |
| 4,897,760 | A | 1/1990 | Bourbeau |
| 5,006,726 | A | 4/1991 | Okumura |
| 5,019,934 | A | 5/1991 | Bentley et al. |
| 5,138,519 | A | 8/1992 | Stockman |
| 5,148,347 | A | 9/1992 | Cox et al. |
| 5,313,360 | A | 5/1994 | Stockman |
| 5,381,301 | A | 1/1995 | Hudis |
| 5,673,168 | A | 9/1997 | Efford et al. |
| 5,921,820 | A | 7/1999 | Dijkstra |
| 5,940,263 | A | 8/1999 | Jakoubovitch |
| 6,009,348 | A | 12/1999 | Rorvick et al. |
| 6,014,308 | A | 1/2000 | Stockman |
| 6,031,713 | A | 2/2000 | Takeisha et al. |
| 6,084,764 | A | 7/2000 | Anderson |
| 6,141,205 | A | 10/2000 | Nutzman |
| 6,147,856 | A | 11/2000 | Karidis |
| 6,157,531 | A | 12/2000 | Breyen et al. |
| 6,212,058 | B1 | 4/2001 | Huber |
| 6,222,270 | B1 | 4/2001 | Lee |
| 6,282,078 | B1 | 8/2001 | Tsai |
| 6,282,081 | B1 | 8/2001 | Takabayashi et al. |
| 6,310,756 | B1 | 10/2001 | Miura et al. |
| 6,313,978 | B1 | 11/2001 | Stockman et al. |
| 6,373,720 | B1 | 4/2002 | Fechtig et al. |
| 6,385,490 | B1 | 5/2002 | O'Phelan |
| 6,404,618 | B1 | 6/2002 | Beard et al. |
| 6,490,158 | B1 | 12/2002 | Ellyson et al. |
| 6,697,249 | B2 | 2/2004 | Maletin et al. |
| 6,798,677 | B2 | 9/2004 | Jakob et al. |
| 6,807,048 | B1 | 10/2004 | Nielsen |
| 6,819,545 | B1 | 11/2004 | Lobo et al. |
| 6,842,328 | B2 | 1/2005 | Schott |
| 6,847,517 | B2 | 1/2005 | Iwaida et al. |
| 6,888,266 | B2 | 5/2005 | Burke et al. |
| 6,922,330 | B2 | 7/2005 | Nielson et al. |
| 6,930,874 | B2 | 8/2005 | Lobo |
| 6,982,539 | B1 | 1/2006 | Ward |
| 6,995,971 | B2 | 2/2006 | Norton |
| 7,031,139 | B1 | 4/2006 | Fayram |
| 7,046,498 | B1 | 5/2006 | Huang |
| D522,456 | S | 6/2006 | Matsumoto |
| 7,110,240 | B2 | 9/2006 | Breyen |
| 7,203,053 | B2 | 4/2007 | Stockman |
| 7,251,123 | B2 | 7/2007 | O'Phelan |
| 7,365,959 | B1 | 4/2008 | Ward |
| 7,423,861 | B2 | 9/2008 | Stockman |
| 7,474,519 | B2 | 1/2009 | Stockman |
| 7,474,520 | B2 | 1/2009 | Kashihara |
| 7,492,574 | B2 | 2/2009 | Fresard et al. |
| 7,511,941 | B1 | 3/2009 | Gallay |
| 7,547,233 | B2 | 6/2009 | Inoue et al. |
| 7,667,954 | B2 | 2/2010 | Lessner |
| 7,710,713 | B2 | 5/2010 | Restorff |
| D621,789 | S | 8/2010 | Wang et al. |
| 7,835,133 | B2 | 11/2010 | Stockman |
| 7,848,079 | B1 | 12/2010 | Gordin et al. |
| 7,867,290 | B2 | 1/2011 | Nielsen |
| 7,881,043 | B2 | 2/2011 | Hirose et al. |
| 7,911,762 | B2 * | 3/2011 | Stockman ................ H01G 2/24 361/301.5 |
| 7,911,766 | B2 | 3/2011 | Caumont et al. |
| 7,952,854 | B2 | 5/2011 | Stockman |
| 7,987,593 | B1 | 8/2011 | Gorst |
| 8,029,290 | B2 | 10/2011 | Johnson |
| 8,170,662 | B2 | 5/2012 | Bocek |
| 8,174,817 | B2 | 5/2012 | Georgopoulos et al. |
| 8,270,143 | B2 | 9/2012 | Stockman |
| 8,274,778 | B2 | 9/2012 | Yoshinaga et al. |
| 8,310,802 | B2 | 11/2012 | Fujii et al. |
| 8,331,076 | B2 | 12/2012 | Tuncer |
| 8,456,795 | B2 | 6/2013 | Stockman |
| 8,465,555 | B2 | 6/2013 | Sherwood |
| 8,514,547 | B2 | 8/2013 | Galvagni |
| 8,514,548 | B2 | 8/2013 | Miller et al. |
| 8,531,815 | B2 | 9/2013 | Stockman |

(56) References Cited

U.S. PATENT DOCUMENTS

| | | | |
|---|---|---|---|
| 8,537,522 B2* | 9/2013 | Stockman | H01G 9/008 361/301.5 |
| 8,559,161 B2 | 10/2013 | Takeoka et al. | |
| 8,761,875 B2 | 6/2014 | Sherwood | |
| 8,842,411 B2 | 9/2014 | Zhang | |
| 8,853,318 B2 | 10/2014 | Tielemans | |
| 8,861,178 B2 | 10/2014 | Terashima et al. | |
| 8,861,184 B2 | 10/2014 | Schmidt | |
| 8,871,850 B2 | 10/2014 | Koh et al. | |
| 8,885,318 B2 | 11/2014 | Stockman | |
| 8,891,224 B2 | 11/2014 | Stockman | |
| D729,164 S | 5/2015 | Chen | |
| 9,105,401 B2 | 8/2015 | Dreissig | |
| 9,318,261 B2* | 4/2016 | Stockman | H01G 2/106 |
| 9,324,501 B2* | 4/2016 | Stockman | H01G 5/38 |
| 9,343,238 B2 | 5/2016 | Stockman | |
| 9,378,893 B2 | 6/2016 | Stockman | |
| 9,412,521 B2 | 8/2016 | Stockman | |
| 9,424,995 B2 | 8/2016 | Stockman | |
| 9,466,429 B1 | 10/2016 | Casanova | |
| D771,567 S | 11/2016 | Flohe et al. | |
| 9,496,086 B2 | 11/2016 | Stockman | |
| 9,536,670 B2 | 1/2017 | Stockman | |
| 9,859,060 B1 | 1/2018 | Stockman et al. | |
| 9,916,934 B1 | 3/2018 | Casanova et al. | |
| D818,437 S | 5/2018 | Stockman | |
| D818,959 S | 5/2018 | Stockman | |
| 10,056,194 B2 | 8/2018 | Stockman | |
| 10,056,195 B2 | 8/2018 | Stockman | |
| D829,173 S | 9/2018 | Stockman | |
| 2001/0025618 A1 | 10/2001 | Kelling | |
| 2006/0201971 A1 | 9/2006 | Wegman | |
| 2006/0227495 A1* | 10/2006 | Stockman | H01G 2/24 361/328 |
| 2007/0002505 A1 | 1/2007 | Watanabe et al. | |
| 2007/0236860 A1 | 10/2007 | Stockman | |
| 2007/0279015 A1* | 12/2007 | Livingston | G05F 1/70 323/209 |
| 2008/0158780 A1 | 7/2008 | Stockman | |
| 2009/0052109 A1 | 2/2009 | Stockman et al. | |
| 2009/0219665 A1 | 9/2009 | Stockman | |
| 2011/0063775 A1 | 3/2011 | Stockman | |
| 2011/0134584 A1 | 6/2011 | Stockman | |
| 2011/0157764 A1 | 6/2011 | Stockman | |
| 2011/0228446 A1 | 9/2011 | Stockman | |
| 2011/0317333 A1 | 12/2011 | Chun | |
| 2013/0003252 A1 | 1/2013 | Stockman | |
| 2013/0214720 A1 | 8/2013 | Stockman | |
| 2013/0329342 A1 | 12/2013 | Stockman | |
| 2013/0343029 A1 | 12/2013 | Stockman | |
| 2014/0049205 A1 | 2/2014 | Curiel | |
| 2014/0126107 A1 | 5/2014 | Yoda et al. | |
| 2014/0201018 A1 | 7/2014 | Chassin | |
| 2014/0285949 A1 | 9/2014 | Stockman | |
| 2014/0347784 A1 | 11/2014 | Stockman et al. | |
| 2015/0016012 A1 | 1/2015 | Stockman | |
| 2015/0022991 A1 | 1/2015 | Stockman et al. | |
| 2015/0138690 A1 | 5/2015 | Stockman | |
| 2015/0255218 A1 | 9/2015 | Stockman et al. | |
| 2016/0203916 A1 | 7/2016 | Stockman | |
| 2016/0233030 A1 | 8/2016 | Stockman | |
| 2017/0011855 A1 | 1/2017 | Stockman et al. | |
| 2017/0032898 A1 | 2/2017 | Stockman | |
| 2017/0110252 A1 | 4/2017 | Stockman | |
| 2017/0186554 A1 | 6/2017 | Stockman | |
| 2017/0236646 A1 | 8/2017 | Stockman | |
| 2017/0372838 A1 | 12/2017 | Casanova et al. | |
| 2018/0254150 A1 | 9/2018 | Stockman et al. | |
| 2018/0261391 A1 | 9/2018 | Stockman | |

FOREIGN PATENT DOCUMENTS

| | | |
|---|---|---|
| EP | 2587503 | 5/2013 |
| FR | 2343221 | 9/1977 |
| GB | 517718 | 2/1940 |
| GB | 2070861 | 9/1981 |
| GB | 2169747 | 7/1986 |

OTHER PUBLICATIONS

Photograph 1 from Defendants' First Supplemental Disclosure of Non-Infringement and Invalidity Contentions, undated (1 page).
Photograph 2 from Defendants' First Supplemental Disclosure of Non-Infringement and Invalidity Contentions, undated (1 page).
Photograph 3 from Defendants' First Supplemental Disclosure of Non-Infringement and Invalidity Contentions, undated (1 page).
Photograph 4 from Defendants' First Supplemental Disclosure of Non-Infringement and Invalidity Contentions, undated (1 page).
Photograph 5 from Defendants' First Supplemental Disclosure of Non-Infringement and Invalidity Contentions, undated (1 page).
Photograph 6 from Defendants' First Supplemental Disclosure of Non-Infringement and Invalidity Contentions, undated (1 page).
Photograph 7 from Defendants' First Supplemental Disclosure of Non-Infringement and Invalidity Contentions, undated (1 page).
Photograph 8, undated (1 page).
Photograph 9, undated (1 page).
Photograph 10, undated (1 page).
Photograph 11, undated (1 page).
Photograph 12, undated (1 page).
Photograph 13, undated (1 page).
Photograph 14, undated (1 page).
Photograph 15, undated (1 page).
Photograph 16, undated (1 page).
Photograph 17, undated (1 page).
Photograph 18, undated (1 page).
Photograph 19, undated (1 page).
Photograph 20, undated (1 page).
Document from Defendants' First Supplemental Disclosure of Non-Infringement and Invalidity Contentions that purported to be Standard for Safety UL 810 Capacitors, Underwriters Laboratories Inc. having multiple dates ranging from 1976 to 1988 (22 pages).
"Industrial Power Factor Correction Capacitors," Cornell Dubilier, Undated (1 page).
"American Radionic Co., Inc. Introduces a New Circuit Component The Patented Ultramet™ Capacitor," poster by American Radionic Co., Inc., (poster undated, 1980 year date appears below one image), (one page).
"AC Capacitors," brochure by AmRad Engineering, Inc., undated (4 pages).
"American Radionic Co., Inc. Introduces a New Circuit Component, The Patented Ultramet™ Capacitor," poster by American Radionic Co., Inc., which is reprint from Electronic News dated Feb. 11, 1980, (one page).
"American Radionic Co., Inc. Introduces . . . The World's First Multiple Metallized Film Dielectric Capacitor Produced from a Single Winding! The Patented Ultramet™ Capacitor," poster by American Radionic Co., Inc. (undated) (one page).
"American Radionic Company's Chronology of Patents, New Products and Technology Transfer Programs—From the Present, to the Past, a Thirty-Five Year Review," online website having URL: http://www.americanradionic.com/content/blogcategory/13/29/8/16, accessed May 19, 2014 (undated) (3 pages).
"American Radionic Introduces Capacitors Without Compromise", color brochure, 1989, (1 page).
"American Radionics—Home of the Turbo200 MultiUse Capacitor," online archive of website captured at http://web.archive.org/web/20050309191805fw_/http://www.americanradionic.com/home, Mar. 9, 2005, (16 pages) (accessed May 29, 2014).
"AmRad Engineering: Universal Capacitor," The Air Conditioning|Heating|Refrigeration News, Jan. 29, 2005, Printout of website having URL: http://www.archrnews.com/articles/print/amrad-engineering-universal-capacitor (accessed Jun. 2, 2014) (1 page).
"Capacitors—Motor Run, Oil Filled Capacitors, AC Rated. AmRad." Online archive of website captured at http:/webarchive.org/web/

(56) References Cited

OTHER PUBLICATIONS

20011126195819/http://www.americanradionic.com, Nov. 26, 2001, (13 pages) (accessed May 29, 2014).
"Capacitors—Motor Run, Oil Filled Capacitors, AC Rated. AmRad." Printout of website having URL: htp://amradcapacitors.com/index.htm, Jan. 3, 2003(20 pages).
"Capacitors—Motor Run, Oil Filled Capacitors, AC Rated. AmRad." Online archive of website captured at http://webarchive.org/web/20041214091042/http://americanradionic.com, Dec. 14, 2004, (13 pages) (accessed May 29, 2014).
Hudis, Martin et al., "Motor-Run Capacitors," Motors & Motor Control, undated (reprinted from Appliance Manufacturer, Oct. 1994) (3 pages).
Hudis, Martin, "Plastic Case Self-Protected Liquid Filled AC Capacitors for 70° Applications," Presented at CAPTECH '97, Mar. 1997, 7 pages.
Hudis, Martin, "Technology Evolution in Metallized Polymeric Film Capacitors over the Past 10 Years," Presented at CARTS Symposium in Nice, France, Oct. 1996, 9 pages.
International Search Report and Written Opinion, PCT/US2014/39003, dated Oct. 2, 2014, 12 pages.
Macomber, Laird L., et al., "New Solid Polymer Aluminum Capacitors Improve Reliability," Electro Power Electronics, Oct. 1, 2001, 5 pages.
Macomber, Laird L., et al., "Solid Polymer Aluminum Capacitor Chips in DC-DC Converter Modules Reduce Cost and Size and Improve High-Frequency Performance," PCIM Power Electronics 2001 Proceeding for the PowerSystems World Conference, Sep. 2001, 8 pages.
Mallory Distributor Products Co., 1967 Precision Electronic Components Catalog, 52 pages.
Parente, Audrey, "Can-sized device the right fit," The Daytona Beach News-Journal, Jan. 3, 2005 (2 pages).
"Product of the Year Awards," Electronic Products Magazine, Jan. 1981, pp. 39-45.
"Super-Sized Show," ASHRae Journal Show Daily, 2005 International Air-Conditioning, Heating, Refrigerating Exposition, Tuesday, Feb. 8, 2005 (24 pages).
"The Patented Ultramet™ Capacitor. A product of years of American Radionic research & development," poster by American Radionic Co., Inc. (undated) (one page).
"The Patented Ultramet™ Capacitor," poster by American Radionic Co., Inc., (undated) (three pages).
Complaint for Patent Infringement against *Cornell-Dubliner Electronics, Inc., Packard Inc.* with Jury Demand (Filing fee $400 receipt No. ORL-38930) filed by *American Radionic Company, Inc.* (Attachments: #1 Civil Cover sheet, #2 Exhibit A)(LMM) Modified on Nov. 19, 2014 (LMM). (Entered: Nov. 19, 2014).
Answer and affirmative defenses to Complaint by Cornell-Dubliner Electronics, Inc. (Allaman, Melissa) (Entered: Jan. 9, 2015).
Answer and affirmative defenses to Complaint by Packard Inc. (Allaman, Melissa) (Entered: Jan. 9, 2015).
First Amended Answer and affirmative defenses to 1 Complaint by Packard Inc. (Allaman, Melissa) (Entered: Jan. 9, 2015).
First Amended Answer and affirmative defenses to 1 Complaint by Cornell-Dubliner Electronics, Inc. (Allaman, Melissa) (Entered: Feb. 4, 2015).
Case Management and Scheduling Order: Amended Pleadings and Joinder of Parties due by Apr. 9, 2015. Discovery due by Feb. 16, 2016. Dispositive motions due by Apr. 7, 2016. Pretrial statement due by Aug. 11, 2016. All other motions due by Jul. 28, 2016. Plaintiff disclosure of expert report due by Dec. 10, 2015. Defendant disclosure of expert report due by Jan. 14, 2016. Final Pretrial Conference set for Aug. 18, 2016 at 01:15 PM in Orlando Courtroom 4 A before Judge Roy B. Dalton, Jr., Jury Trial Set for the trial team commencing Sep. 6, 2016 at 09:00 AM in Orlando Courtroom 4 A before Judge Roy B. Dalton Jr., Conduct mediation hearing by Mar. 29, 2016. Lead counsel to coordinate dates. Signed by Judge Roy B. Dalton, Jr. on Feb. 10, 2015. (VMF). (Entered: Feb. 10, 2015).
Status report Joint Claim Construction Statement by American Radionic Company, Inc., Packard Inc., and Cornell-Dubliner Electronics, Inc. (Attachments: #1 Exhibit 1, #2 Exhibit 2) (Graubart, Noah) Modified on May 29, 2015 (Swt). (Entered: May 28, 2015).
Declaration of Noah C. Graubart in Support of Plaintiff's Claim Construction Brief by American Radionic Company, Inc. (Attachments: #1 Exhibit 1, #2 Exhibit 2, #3 Exhibit 3, #4 Exhibit 4, #5 Exhibit 5, #6 Exhibit 6) (Graubart, Noah) (Entered: Jun. 18, 2015).
Plaintiff'S Brief re 59 Declaration Plaintiff's Claim Construction Brief filed by American Radionic Company, Inc. (Graubart, Noah) (Entered May 18, 2015).
Response to Plaintiff's Claim Construction Brief re 60 Brief—Plaintiff filed by Cornell-Dubliner Electronics, Inc., Packard Inc. (Killen, Craig) Modified on Jul. 17, 2015 (EJS). (Entered Jul. 16, 2015).
Joint Pre-Hearing Statement re: Claim Construction by American Radionic Company, Inc., Packard Inc., Cornell-Dubliner Electronics, Inc. (Attachments: #1 Exhibit 1, #2 Exhibit 2) (Graubart, Noah) Modified on Jul. 24, 2015.
Minute Entry, Proceedings of Claim Construction Hearing held before Judge Roy B. Dalton, Jr. on Aug. 24, 2015. Court Report: Arnie First (VMF) (FMV). (Entered: Aug. 24, 2015).
Notice of Filing of Claim Construction Evidence by American Radionic Company, Inc. (Attachments: #1 Exhibit 1, #2 Exhibit 2, #3 Exhibit 3) (Graubart, Noah) Modified on Aug. 25, 2015 (EJS). (Entered: Aug. 25, 2015).
Transcript of Markman Hearing held on Aug. 24, 2015 before Judge Roy B. Dalton, Jr., Court Reporter Arnie R. First, DRD, CRR< ArnieFirst.CourtReporter@gmail.com. Transcript may be viewed at the court public terminal or purchased through the Court Reporter before the deadline for Release of Transcript Restriction. After that date it may be obtained through PACER or purchased through the court Reporter, Redaction Request due Oct. 22, 2015. Redacted Transcript Deadline set for Nov. 2, 2015. Release of Transcript Restriction set for Dec. 30, 2015. (ARF) (Entered: Oct. 1, 2015).
Order granting 69 Motion for Consent Judgment and Injunction, Signed by Judge Roy B. Dalton, Jr. on Nov. 5, 2015. (CAC) (Entered Nov. 5, 2015).
Amazon. <URL: https://www.amazon com/CPT00656-Trane-Round-Capacitor-Upgrade/dp/BOOEVTIOMC/ref=cm_cr_arp_d_product_top?ie=UTF8.> May 11, 2016. Replacement Trane Round Dual Run Capacitor, 6 pages.
Amazon. <URL: https://www.amazon.com/MARS-Motors-Armatures-12788-Capacitor/dp/BOOCOYS2CM/ref=pd_sim_328_6?_encoding=UTF8&pd_rd_i=BOOCOYS2CM&pd_rd_r=KEFT1DXGOAWQ1KCZDJFJ&pd_rd_w=LNF6S&pd_rd_wg=5eFTh&psc=1&refRID=KEFT1DXGOAWQ1KCZDJFJ.> Jan. 25, 2012. MARS Dual Run Capacitor, 7 pages.
Amazon. <URL: https://www.amazon.com/AmRad-Turbo-200-Mini-Oval/dp/BOOKQSKDOY/ref=pd_sbs_60_4?_encoding=UTF8&pd_rd_i=BOOKQSKDOY&pd_rd_ r=A6')/0E2')/080')/0A6.> May 5, 2015. AmRad Turbo 200 Mini Oval Capacitor with label and color trim, 5 pages.
Amazon. <URL: https://www.amazon.com/AmRad-U5A2227-MFD-370-Volt/dp/BOOGSU3YV8/ref=pd_day0_328_6?_encoding=UTF8&pd_rd_i=BOOGSU3YV8&pd_rd_r%E2')/080')/0A6.>Jun. 29, 2014. AmRad Dual Run Capacitor, 6 pages.
Amazon. <URL: https://www.amazon.com/gp/product/B01HPK5ANO/ref=s9_dcacsd_dcoop_bw_c_x_6_w.>Aug. 21, 2016. Titan TRCFD405 Dual Rated Motor Run Capacitor, 6 pages.
Amazon. <URL: https://www.amazon.com/Labels-Protective-Backed-Clean-Remove-Adhesive/dp/BOOVIDW1C1/ref=sr_1_18?ie=UTF8&clid=1522957818&sr=8-18&keycY0E2')/080')/0A6.>Apr. 1, 2015. Labels, 7 pages.
Amazon. <URL: https://www.amazon.com/Packard-TRCFD405-5MFD-370VACCapacitor/dp/B009558E9U/ref=pd_sim_328_4?_encoding=UTF8&pd_rd_i=B009558E9U&pd_rd_r=SX1DRWZQZ8SH12JWHYH2&pd_rd_w=y1jQe&pd_rd_wg=mH0n1&psc=1&refRID=SX1DRWZQZ8SH12JWHYH2&dp1D=31IxzeyCr/0252B7L&preST=_QL70_&dpSrc=detail.>May 1, 2015. Packard Capacitor, 5 pages.
Amazon. <URL: https://www.amazon.com/Universal-Capacitor-Trane-Replacement - USA2031/dp/BOOGSU4OKW/ref=pd_sim_

(56) References Cited

OTHER PUBLICATIONS

328_3?_encoding=UTF8&pd_rd_i=BOOGSU4OKW&pd_rd_r= YX6P84XR7NY113X4DWJG&pd_rd_w=gejaD&pd_rd_wg=NLVIY &psc=1&refRID=YX6P84XR7NY113X4DWJG.> Nov. 26, 2014. Am Rad Oval Universal Capacitor with label and color trim, 6 pages.

Amazon. <URL:https://www.amazon com/dp/B01F7P8GJO/ref= sspa_dk_detail_4?psc=1.> Aug. 1, 2016. TradePro PowerWell Dual Run Round Capacitor, 6 pages.

YouTube. <URL: https://www.youtube.com/watch?v=19A9IvQ611A &t=3s.> Oct. 1, 2015. GE Dual Run Capacitor, 5 pages.

YouTube. <URL: https://www.youtube.com/watch?v=Xiw_xHXJHUg.> Sep. 4, 2011. AmRad Dual Run Capacitor, 4 pages.

Grainger, "Round Motor Dual Run Capacitor, 40/5 Microfarad Rating, 370VAC Voltage," Retrieved from the Internet: URL<https://www.grainger.com/product/5CMW3 &AL!2966!3!166587674359!!!g!82128730437!?cm_mmc=PPC:+ Google+PLA?campaignid=719691765&s_kwcid= AL!2966!3!166587674359!!!!82128730437!&ef_id= WRSnxQAAAILWhRlb:20170824174108:s>. Visited Aug. 24, 2017, Capacitor.

Amazon. <URL: https://www.amazon.com/Amrad-Turbo-Universal-Motor-Capacitor/dp/B00B610TOM/ref=pd_rhf_dp_s_cp_0_7?_encoding=UTF8&pd_rd_i=BOOB610TOM&pd_rd_r= N5WYCAD5Y36C86DFWDEG&pd_rd_w=6tW71&pd_rd_wg= DWEJcApsc=1&refRID=N5WYCAD5Y36C86DFWDEG.> Jan. 27, 2013. Amrad Turbo 200X Universal Motor Run Capacitor.

YouTube. <URL: https://www.youtube.com/watch?v=R5B189BWrz0.> Jul. 29, 2011. HVAC Service : Install New Turbo 200 Capacitor.

YouTube. <URL: https://www.youtube.com/watch?v=U7h7pg12t6M.> Jul. 15, 2011. How to Install the Turbo 200 Capacitor.

\* cited by examiner

POWER FACTOR CORRECTION CAPACITORS

CLAIM OF PRIORITY

This application is a continuation of and claims priority under 35 USC § 120 to U.S. patent application Ser. No. 15/276,129, filed Sep. 26, 2016, which is a continuation of U.S. patent application Ser. No. 14/663,620, filed Mar. 20, 2015, now U.S. Pat. No. 9,496,086, issued on Nov. 15, 2016, which is a continuation of U.S. patent application Ser. No. 14/283,960, filed on May 21, 2014, now U.S. Pat. No. 9,318,261, issued on Apr. 19, 2016, which claims benefit of priority under 35 USC § 119(e) to U.S. Patent Application Ser. No. 61/825,850, filed on May 21, 2013, the entire contents of each of which are hereby incorporated by reference.

BACKGROUND

This description relates to a single device capable of providing selectively connectable capacitive elements for power factor correction.

In general, power factor can be considered a measure of efficiency as represented by the ratio of the average power available and the actual amount of power being used. For alternating current (AC) electrical systems such as electrical power systems, the power factor can be defined as the ratio of the real power flowing to a load, to the apparent power in the load. Real power is generally considered the capacity of the circuit for performing work in a particular time, and, apparent power is the product of the current and voltage of a circuit such as a load. This ratio is a dimensionless number and can be scaled over a particular numerical range (e.g., between −1 and 1). Due to energy stored in the load and returned to the source, due to a non-linear load, etc., the apparent power is typically greater than the real power.

In such electrical systems such as electrical power systems, a load with a low power factor draws more current than a load with a high power factor for the same amount of power being transferred. Correspondingly, higher currents associated with lower power factors can result in an increase is wasteful energy lost and a higher cost to industrial and commercial customers operating with low power factors.

SUMMARY

The apparatus and techniques described here relate to providing selectable amounts of capacitance for providing different levels of reactive power from a single device to achieve more functionality and flexibility from the single device, reduce inventory and converse storage space.

In one aspect, an apparatus includes a case capable of receiving a plurality of capacitive elements, each capacitor element having at least two capacitors, and each capacitor having a capacitive value. The apparatus also includes a cover assembly with a peripheral edge secured to the case. The cover assembly includes, for each of the plurality of capacitive elements, a cover terminal that extends upwardly from the cover assembly generally at a central region of the cover assembly. Each cover terminal is connected to one of the at least two capacitors of the respective one of the plurality of capacitive elements. The cover assembly also includes, for each of the plurality of capacitive elements, a cover terminal that extends upwardly from the cover assembly at a position spaced apart from the cover terminal generally at the central region of the cover assembly. Each cover terminal at the spaced apart position is connected to another of the at least two capacitors for the respective one of the plurality of elements. The cover assembly also includes a common insulation barrier mounted to the cover assembly. One cover terminal that extends upwardly from the cover assembly generally at the central region of the cover assembly extends through the common insulation barrier. The common insulation barrier includes barrier fins extending radially outwards. The cover assembly also includes a separate insulation barrier mounted to the cover assembly. One cover terminal that extends upwardly from the cover assembly at the spaced apart position extends through the separate insulation barrier.

Implementations may include any or all of the following features. Two or more of the at least two capacitors may have equivalent capacitance values. Two or more of the at least two capacitors for each of the plurality of capacitive elements may have equivalent capacitance values. The capacitive elements may include a cylindrically wound capacitive element. The apparatus may further include an insulating fluid in the case at least partially surrounding the plurality of capacitive elements. The cover terminal that extends upwardly from the cover assembly generally at the central region of the cover assembly may have a first size and the cover terminal that extends upwardly from the cover assembly at the spaced apart position may have a second size, different from the first size. The first size may be a first diameter and the second size is a second diameter. The plurality of capacitive elements may be connected in a delta configuration. The at least two capacitors may be connected in parallel by connecting the cover terminal that extends upwardly from the cover assembly generally at the central region of the cover assembly and the cover terminal that extends upwardly from the cover assembly at the spaced apart position. The apparatus may have a first KVAR value for the cover terminal that extends upwardly from the cover assembly generally at the central region of the cover assembly being disconnected from the cover terminal that extends upwardly from the cover assembly at the spaced apart position. The apparatus may have a first KVAR value for the cover terminal that extends upwardly from the cover assembly generally at the central region of the cover assembly being disconnected from the cover terminal that extends upwardly from the cover assembly at the spaced apart position, and, the apparatus may have a second KVAR value for the cover terminal that extends upwardly from the cover assembly generally at the central region of the cover assembly being connected to the cover terminal that extends upwardly from the cover assembly at the spaced apart position.

In another aspect, an apparatus includes a case capable of receiving a plurality of capacitive elements, each capacitor element having at least two capacitors, and each capacitor having a capacitive value. The apparatus also includes a cover assembly with a peripheral edge secured to the case. The cover assembly includes, for each of the plurality of capacitive elements, a cover terminal that extends upwardly from the cover assembly generally at a central region of the cover assembly. Each cover terminal is connected to one of the at least two capacitors of the respective one of the plurality of capacitive elements. The cover assembly also includes, for each of the plurality of capacitive elements, a cover terminal that extends upwardly from the cover assembly at a position spaced apart from the cover terminal generally at the central region of the cover assembly. Each cover terminal at the spaced apart position is connected to another of the at least two capacitors for the respective one of the plurality of elements. The cover assembly also includes a common insulation barrier mounted to the cover assembly. One cover terminal that extends upwardly from the cover assembly generally at the central region of the cover assembly extends through the common insulation barrier. The common insulation barrier includes barrier fins extending radially outwards. The cover assembly also includes a separate insulation barrier mounted to the cover assembly. One cover terminal that extends upwardly from the cover assembly at the spaced apart position extends through the separate insulation barrier. The apparatus has a first KVAR value for the cover terminal that extends upwardly from the cover assembly generally at the central region of the cover assembly being disconnected from the cover terminal that extends upwardly from the cover assembly at the spaced apart position, and, the apparatus has a second KVAR value for the cover terminal that extends upwardly from the cover assembly generally at the central region of the cover assembly being connected to the cover terminal that extends upwardly from the cover assembly at the spaced apart position.

Implementations may include any or all of the following features. Two or more of the at least two capacitors may have equivalent capacitance values. Two or more of the at least two capacitors for each of the plurality of capacitive elements may have equivalent capacitance values. The capacitive elements may include a cylindrically wound capacitive element. The apparatus may further include an insulating fluid in the case at least partially surrounding the plurality of capacitive elements.

These and other aspects and features and various combinations of them may be expressed as methods, apparatus, systems, means for performing functions, program products, and in other ways.

Other features and advantages will be apparent from the description and the claims. Other and more specific objects and features will, in part, be understood by those skilled in the art and will, in part, appear in the following description of the preferred embodiments, and claims, taken together with the drawings

DETAILED DESCRIPTION

Figure 1:
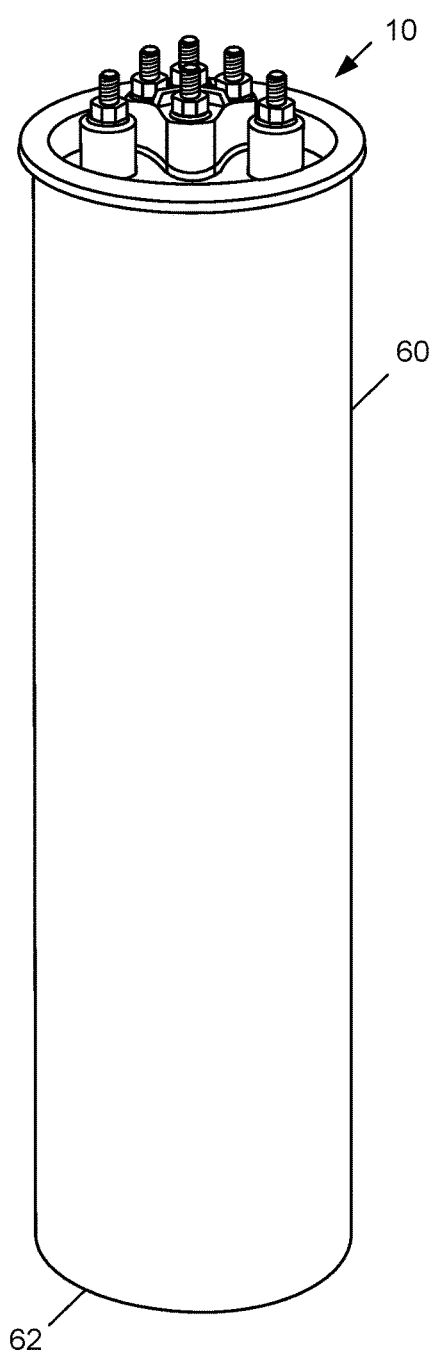
FIG. 1 is a perspective view of an adjustable power factor correction capacitor capable of providing selectable reactive power.

Given the inefficient effects of operating under a lower power factor condition, a high power factor is generally desirable in electrical systems (e.g., an electric transmission system) to reduce transmission losses and improve voltage regulation at a load. For such operations, it is often desirable to adjust the power factor of a system to a value as close to 1.0 as possible. In one example of adjusting power factor, reactive elements may be used to supply or absorb reactive power near the load, and thereby reduce the apparent power. By taking such corrective steps to adjust the power factor, improvements in stability and efficiency of the electrical system may be achieved.

To implement such a power factor correction, one or more techniques may be utilized. For example, a network of one or more capacitors, inductors, etc., may be used to correct low power factors of various types of loads. For example, a linear load generally presents a constant load to a supply. Power factor correction for such a linear load can be provided by presenting a reactive load of equal and opposite sign. For example, linear load power factor correction can be applied by adding capacitors for an inductive load, and/or, adding inductors for a capacitive load. In one scenario, one or more motors may present an inductive load to a supply, and capacitors may be added to neutralize the effect of the load inductance and adjust the power factor to a value closer to a unity. Typically devices used for correcting the power factor are deployed near the load (e.g., at a power panel, etc.), however in some arrangements the devices may be installed at a relatively remote location (e.g., at a central substation, etc.). Along with being installed at a single location, such devices may also be installed in a distributed manner over multiple locations. In some arrangements, such power factor correction devices may be able to compensate for sudden changes of power factor, for example, due to large fluctuating industrial loads.

In general, the reactive power provided by a capacitor can be represented as a measure of volt-ampere reactive (VAR). In many instances this measure is scaled (e.g., by a factor of one thousand) to be represented as a kilovar (KVAR) of the reactive power supplied by the capacitor. In general, the KVAR of a capacitor can be determined from its capacitive reactance, $X_c$, which can be defined as:

$$X_c = \frac{1}{(2\pi fC)} \quad (1)$$

where f is frequency and C is the capacitance of the capacitor. From this quantity, the KVAR rating of the capacitor can be calculated from:

$$KVAR = \frac{(V_n)^2}{(1000 X_c)} \quad (2)$$

where $V_n$ is the voltage applied to the terminals of the capacitor. As provided by equations (1) and (2), the KVAR rating of a capacitor is directly proportional to the capacitance value of the capacitor and thereby the KVAR rating increases with capacitance. As such, to adjust the KVAR for appropriately supplying a load, different and selectable values of capacitances may need to be installed near the load.

Figure 2:
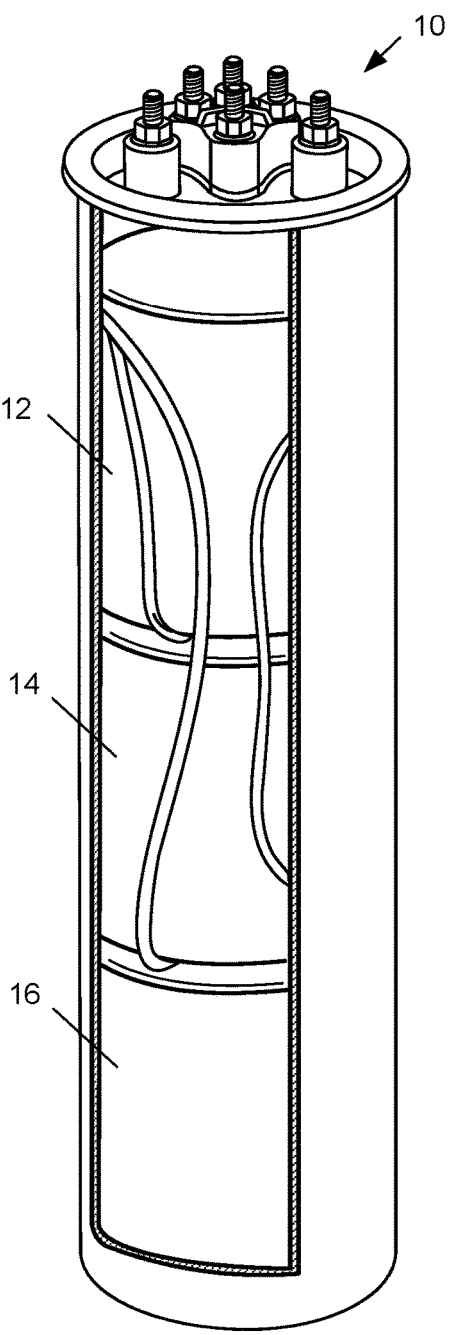
FIG. 2 is an exploded view of the adjustable power factor correction capacitor of FIG. 1.

To efficiently provide different KVARs, capacitances, and other parameters associated with power factor correction (e.g., for different applications), an adjustable power factor correction capacitor 10 is shown in FIGS. 1-2. In general, the adjustable power factor correction capacitor 10 allows one of multiple (e.g., two) KVARs to be selected prior to installation. As such, a technician can easily carry a single device and be able to select a KVAR value for applying to a particular load. By incorporating the functionality of multiple devices into a single device, the total number of power factor correction capacitors needed in stock can be reduced along with the number of different variations of capacitors to install for different load conditions. Similarly, less power factor correction capacitors need to be carried to the site, e.g., for service calls.

In this arrangement, the adjustable power correction capacitor 10 includes a number of capacitive elements (e.g., capacitive element 12, 14, 16), as presented in the exploded view in FIG. 2. Each of the capacitive elements 12, 14, 16 includes multiple capacitor sections and each individual section provides a capacitance value. In the illustrated example, each of the capacitive elements 12, 14, 16 includes two separate capacitor sections with corresponding capacitance values that may or may not be equivalent (e.g., both may have equivalent or different capacitance values represented in micro-farads). To provide such capacitive elements with dual capacitance values, one or more production techniques may be implemented, for example, each element may be produced as a wound cylindrical element. In one arrangement, capacitor sections of the capacitive element 12 can be wound on a winding machine onto a rotating spindle. In particular, to form the element, one metallized dielectric film can fed from a first supply roll, and a second metallized dielectric film can fed from a second supply roll. In general, both films carry near their respective surfaces a thin metallic layer that extends to one edge (e.g., the right or left edge) of the film but terminates short of the opposing edge (e.g., the left or right edge) leaving a non-metallized strip therealong.

Figure 3:
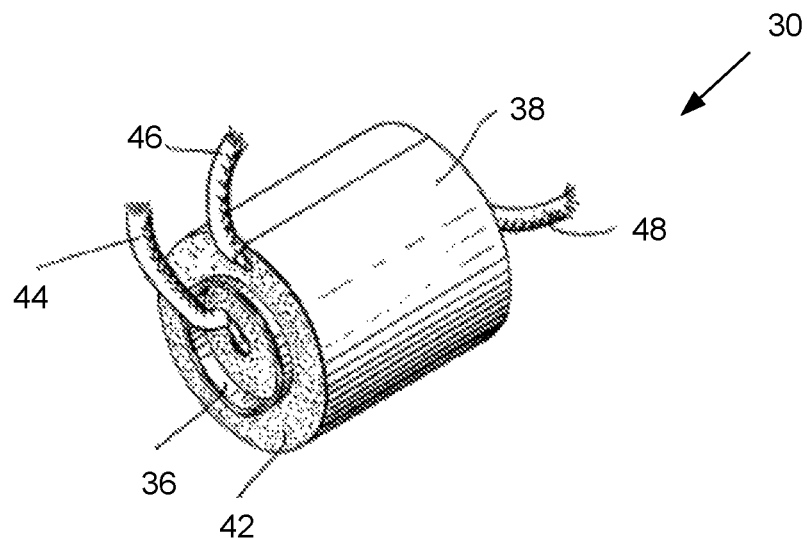
FIG. 3 is a perspective view of one capacitive element included in the adjustable power factor correction capacitor of FIG. 1.
Figure 4:
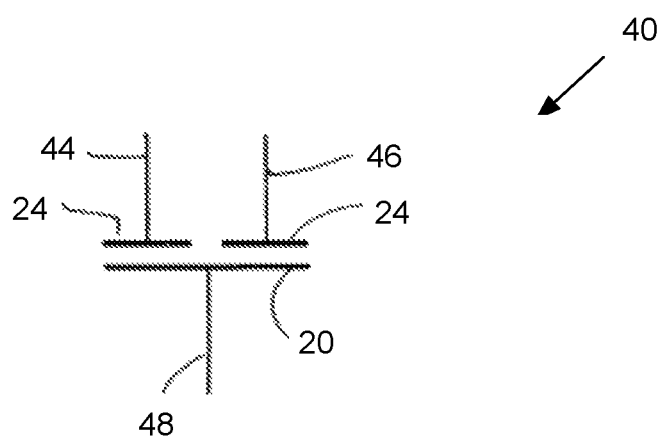
FIG. 4 is an electrical schematic of one capacitive element included in the adjustable power factor correction capacitor of FIG. 1.

Referring to FIGS. 3 and 4, an illustration of a wound capacitive element 30 (e.g., the capacitive element 12) and a corresponding schematic diagram 40 are presented. As illustrated in the schematic diagram 40, the capacitive element 30 includes a pair of capacitors that share a common single plate 20. To produce this capacitive element 30, the two films can be wound on the spindle of a winding machine for a preselected number of revolutions. The number of revolutions generally depends upon the capacitance value desired. If the capacitance values of the dual capacitors are to be equal, one-half of the total length of the film is first wound. Once this portion is wound, the winding machine is stopped and voltage is applied to the metal layer of the film (e.g., by an electrode). The winding process is then continued, for example at a slower speed, and the metallic layer is vaporized, leaving a non-metallized intermediate region. The length of the non-metallized region is generally sufficient to encircle the capacitive element 30 at least once. During the interval of winding the region around the capacitive element 30, there is inserted into the section a non-conductive sheet 36 of a material, such as a plastic. The sheet 36 is generally not centered along the length of the cylindrical section of the element. As illustrated in FIG. 4, accordingly, upon continued winding the sheet 36 forms a circular barrier which extends outwardly from that end of the capacitive element 30 having the metallized edge of film.

Winding is continued and terminated for the first and second films and the completed element may be wrapped, for example, by a suitable tape 38.

Figure 5:
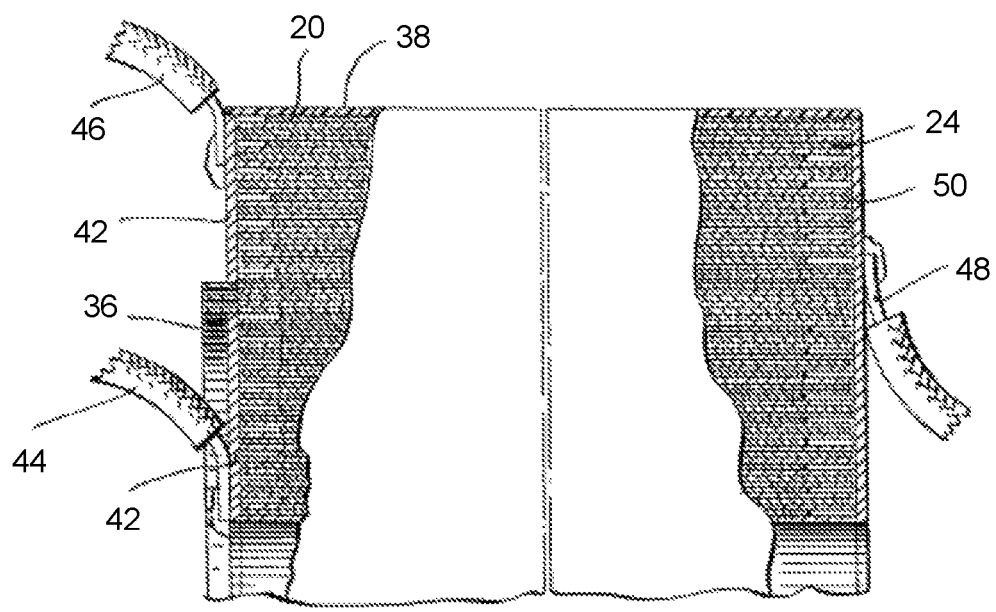
FIG. 5 is a partial cross section of one capacitive element included in the adjustable power factor correction capacitor of FIG. 1.

As illustrated in FIG. 3, the capacitive element 30 is metal plated in a manner employed for attaching leads, e.g. the ends are sprayed with molten copper to which a layer of solder is applied. Thereafter, the barrier formed by sheet 36 is trimmed as shown in FIG. 5. The completed element, as shown in FIGS. 3 and 5 includes on one end, for example, a copper-solder layer 50 which electrically engages the metallized layer 20 of the first film (for the common single plate). The opposite end of the capacitive element 30 includes a similar layer 42 which, however, is interrupted by the barrier formed by sheet 36 so that the inner layer engages that portion of metallized layer 24 of the second film (for one capacitor plate) while the outer portion engages the metallized layer 24 which succeeded the formation of the non-metallic region (for another capacitor plate). Thereafter, conductors 44, 46 may be soldered to these regions as indicated. A conductor 48 may be similarly soldered to the opposite end. Generally, the capacitive element 30 formed from metallized film is generally compact in size and simultaneously provides for the attachment of leads and maintaining the separate electrical integrity of the multiple capacitors included in the element. One or more techniques may be employed for producing such capacitive elements, such as techniques described in U.S. Pat. Nos. 3,921,041, 4,028,595, 4,263,638, 4,312,027, 4,352,145, 4,558,394 and 5,313,360, each of which is incorporated by reference herein.

Referring back to FIG. 2, similar to the capacitive element 12, in this arrangement each of the other capacitive elements 14 and 16 can be produced in a similar manner. For example, each element is produced on a central spool or mandrel, which has a central opening. First and second dielectric films, each having a metalized layer on one side thereof, are wound in cylindrical form on the mandrel with the nonmetalized side of one film being in contact with the metalized side of the other. Selected portions of one or both of the metalized layers are removed in order to provide a capacitor. Also similar to capacitive element 12, to form the two capacitors, an element insulation barrier is inserted into the winding to separate the capacitors, the element insulation barrier also assuming a cylindrical configuration. In some arrangements, the element insulation barrier may be a material such as an insulating polymer sheet material. A variety of thicknesses may be used, for example the thickness may range from 0.0025 to 0.007 inch. Other materials may also be employed, and generally the material or materials employed for the barrier is substantially able to withstand heat from adjacent soldering without losing integrity of electrical insulation, such that adjacent sections can become bridged. In this arrangement, conductors in the form of insulated wires are used to electrically connect the capacitive elements 12, 14, 16 (as shown in FIG. 2). To assist with the connections and assembly of the power factor correction capacitor 10, the insulation of the wires may be color-coded to facilitate identifying which wire is connected to which capacitive element. In some arrangements other types of conductors may be used in place of or in combination with insulated wires, for example, foil strip conductors may be implemented.

Each of the capacitive elements 12, 14, 16 may provide a variety of capacitance levels. For example, in this arrangement the two capacitors of each capacitive element may provide equivalent capacitances. In one arrangement, both capacitors may have a value of 38.0 microfarads, or, in another arrangement both of the capacitors may have a lesser values such as 19.0 microfarads or larger values such as 76.0 microfarads. Different ranges of capacitance may also be produced for the capacitive elements (e.g., values larger than 76.0 microfarads, values less than 19.0 microfarads, values between 76.0 microfarads and 19.0 microfarads, etc.). Other parameters of the power factor correction capacitor 10 may also be identified for developing and producing the capacitive elements. For example, the capacitive elements 12, 14 and 16 may be designed for larger or smaller KVAR ratings, voltage ratings, etc. as needed. While equivalent capacitance values may be provided by each of the capacitive elements, one or more of the elements may be produced to provide different capacitance values. Similarly, each of the elements may provide one or more capacitance values that are different from the capacitance values provided by other elements. Regarding the methodology described above for producing the capacitive elements, the capacitance value generally increases with the amount of metallic film included in each capacitor; however, one or more other techniques may be implemented for providing capacitors of the sections of the capacitive elements. Further, while each capacitive element may provide two capacitors, more or less capacitors may be provided by a capacitive element.

As illustrated in FIGS. 1 and 2, the power correction capacitor 10 includes a case 60, having a generally cylindrical side wall and a bottom wall 62 (not visual in the figure). In one example, the case 60 is formed of aluminum and the cylindrical side wall has an outside diameter of approximately 3.50 inches. Such a diameter for power correction capacitors of this type can be considered as being readily receivable in a mounting space. Other diameters may, however, be used, and the case may be produced from other suitable materials such as plastic or a combination of materials.

In some arrangements, one or more insulating fluids (not shown) is provided within the case 60, at least partly and preferably substantially surrounding all or a portion of the capacitive elements 12, 14, 16. A variety of fluids may be implemented such as a polyurethane oil. The insulating fluid may have a viscosity in the range of about 500 to 3000 poise at 25° C., and preferably, a viscosity is in the range of about 1900 to 2500 poise at 25° C. The insulating fluid may be produced by reacting a primary polyol, such as castor oil, a ricinoleic acid derivative thereof or a combination of both, with an organic polyisocyanate. The reaction may be carried out in the presence of a secondary polyol which acts as a chain extender for the urethane polymerization. Organic polyisocyanates that can be utilized to produce the insulating fluid include: aliphatic polyisocyanates, cycloliphatic polyisocyanates, aromatic polyisocyanates, polymethyleneisocyanates, polyphenylisocyanates, methylenediisocyanates and any organic polyisocyanates that are prepolymers prepared by reacting a polyisocyanate with any polyol in quantities such that the NCO/OH ratio is greater than 1 to 1. A preferred secondary polyol is hydroxy-terminated polybutadiene diol because it demonstrates outstanding electrical and thermal expansion properties as well as provides structural support to the resulting polymeric matrix.

Generally, the overall NCO/OH ratio (OH groups of both primary and secondary polyols if present) to produce the high viscosity polyurethane oil may range from about 0.1 to 1 to about 0.6 to 1. The desired NCO/OH ratio and the particular polyisocyanate, primary and secondary polyol starting materials chosen for the reaction can dictate the final viscosity of the resulting polyurethane oil insulating fluid. Typically, any reaction done with an NCO/OH ratio higher than about 0.6 to 1 will generally produce a solid elastomeric material which is unsuitable for use as an insulating oil in metallized film capacitors.

In general, a polyurethane oil insulating fluid used is not expected to provide any substantial dielectric properties to the power factor correction capacitor 10 as it is not intended to impregnate or otherwise penetrate into the capacitive elements 12, 14, 16. However, because the capacitive elements are not a hermetically sealed unit, under certain conditions of time, temperature and production techniques, it is possible that some insulating fluid could migrate into the capacitive elements such that the insulating fluid contacts the marginal edges, and in some instances, the few outer layers of the tightly wound metallized polymer films. To the extent that some polyurethane oil insulating fluid has made contact with the materials forming one or more of the capacitive elements, operation of the power factor correction capacitor should be generally unaffected.

Figure 6:
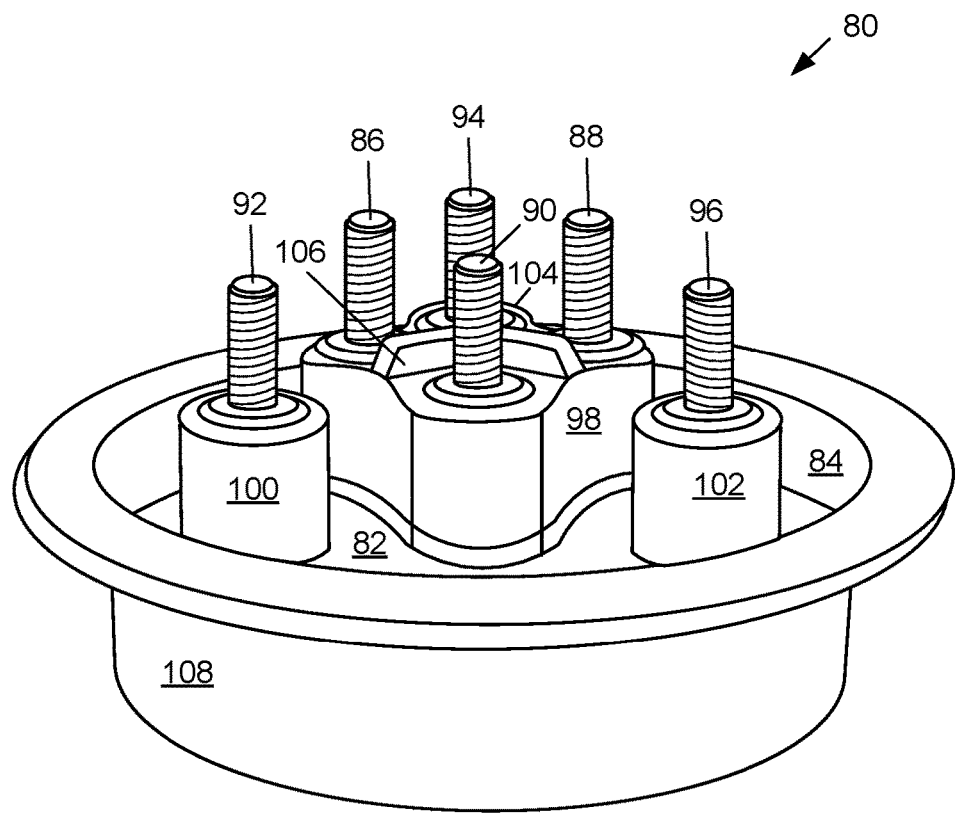
FIG. 6 is a cover assembly for the adjustable power factor correction capacitor of FIG. 1.

The power factor correction capacitor 10 also has a cover assembly 80 as illustrated in FIG. 6. Along with providing the ability to form electrical connections with the capacitive elements contained in the case 60, the cover assembly 80 may provide other functionality. For example, the cover assembly 80 may include a pressure interrupter. In this arrangement, the cover assembly 80 includes a circular cover 82, which may be deformable, having an upstanding cylindrical skirt 84 and a peripheral rim. The skirt 84 generally fits into the open top formed from by the cylindrical side wall of the case 60, and the peripheral rim may be crimped into position to seal the interior of the capacitor 10 and any fluid contained therein.

In this arrangement, the cover assembly 80 includes six cover terminals mounted on the circular cover 82. For this example, each of the cover terminals take the form of a treaded portion of a bolt, however, other types of electrically conductive connections and devices may be utilized. Three of the cover terminals 86, 88, 90, each corresponding to one of the capacitors of the three capacitive elements, are mounted generally centrally on the circular cover 82. For each companion capacitor (of the capacitive elements 12, 14, 16) a corresponding cover terminal (e.g., cover terminals 92, 94 and 96) is mounted at a spaced apart location. In this particular arrangement, the cover terminals 86, 88 and 90 emerge from a common insulation barrier 98 while the cover terminals 92, 94, and 96 emerge from separate insulation barriers 100, 102 and 104. Due to their respective separations and insulation barriers, each of the cover terminals are substantially insulated from each another and the circular cover 82.

To assist with insulating the cover terminals 86, 88, 90 that share the common insulation barrier 98, three barrier fins 106 extend respectively radially outwardly from a central point of the common insulation barrier to corresponding edges such that they are deployed between adjacent pairs of the cover terminals 86, 88 and 90. This provides additional protection against any arcing or bridging contact between adjacent cover terminals 86, 88 and 90. In some arrangements the three fins may further extend vertically for additional isolation of the cover terminals 86, 88 and 90.

In this arrangement, the cover assembly 80 also includes a disconnect plate 108, which may be constructed of one or more rigid insulating materials such as a phenolic. The disconnect plate 108 is spaced below the circular cover 82, e.g., by one or more spacers. The disconnect plate 108 is provided with openings accommodating the distal ends of terminal posts (not shown) that are respectively connected to a corresponding one of the cover terminals 86-96. As such, the openings allow for electrical connections to be established between the cover terminals 86-96 and the capacitors of the capacitive elements 12, 14, 16 included in the power factor correction capacitor 10. To assist with providing access to the terminal posts, the disconnect plate 108 may be provided with mechanical guides (e.g., raised linear guides, dimple guides 142, etc.) generally adjacent the openings to accommodate the distal ends of the terminal posts.

To connect the capacitors of the capacitive elements to the corresponding cover terminals of the cover assembly 80, one or more techniques may be implemented. For example, wires, foil strips, etc. may be electrically connected to the distal ends of terminal posts as provided through openings in the disconnect plate 108. In general, wires are desirable in place of foil strips because they are better accommodated in the case 60 and have good insulating properties, resist nicking and are readily available with colored insulations. In order to make the necessary connection of the wires to their respective cover terminal posts, foil tabs may be welded to each of the distal ends of the terminal posts of the cover terminals 86-96, and the guides may be helpful in positioning the foil tabs for the welding procedure. The attachment may be accomplished by welding the distal end of a foil strip to the terminal post, and then cutting the foil strip to leave a foil tab. Thereafter, a wire conductor may be soldered to the tab. Other wires may be similarly connected to their respective cover terminals using this technique or one or more other conductive attachment techniques may be employed.

Accordingly, one of the two capacitors for each of the capacitive elements 12, 14, 16 is connected to a corresponding cover terminal 86, 88, 90 that emerges from the common insulation barrier 98 and the companion capacitor for each of the capacitive elements 12, 14, 16 is connection to a corresponding cover terminal 92, 94, 96 that emerges from one of the separate insulation barriers 100, 102, 104. In some arrangements the cover terminals and/or insulation barriers may be color coded to assist a technician with identifying the capacitors (and corresponding capacitance values) of the capacitive elements included in the power factor correction capacitor 10. Similarly, wire conductors connecting the capacitors (of the capacitive elements) and terminal posts may be color-coded to facilitate assembly, in that each capacitor and its wire conductor are readily associated with the correct corresponding section cover terminal, and that the correct capacitor and/or capacitive element can be identified on the cover of the cover assembly 80 to make the desired connections for establishing a selected capacitance value.

Figure 7:
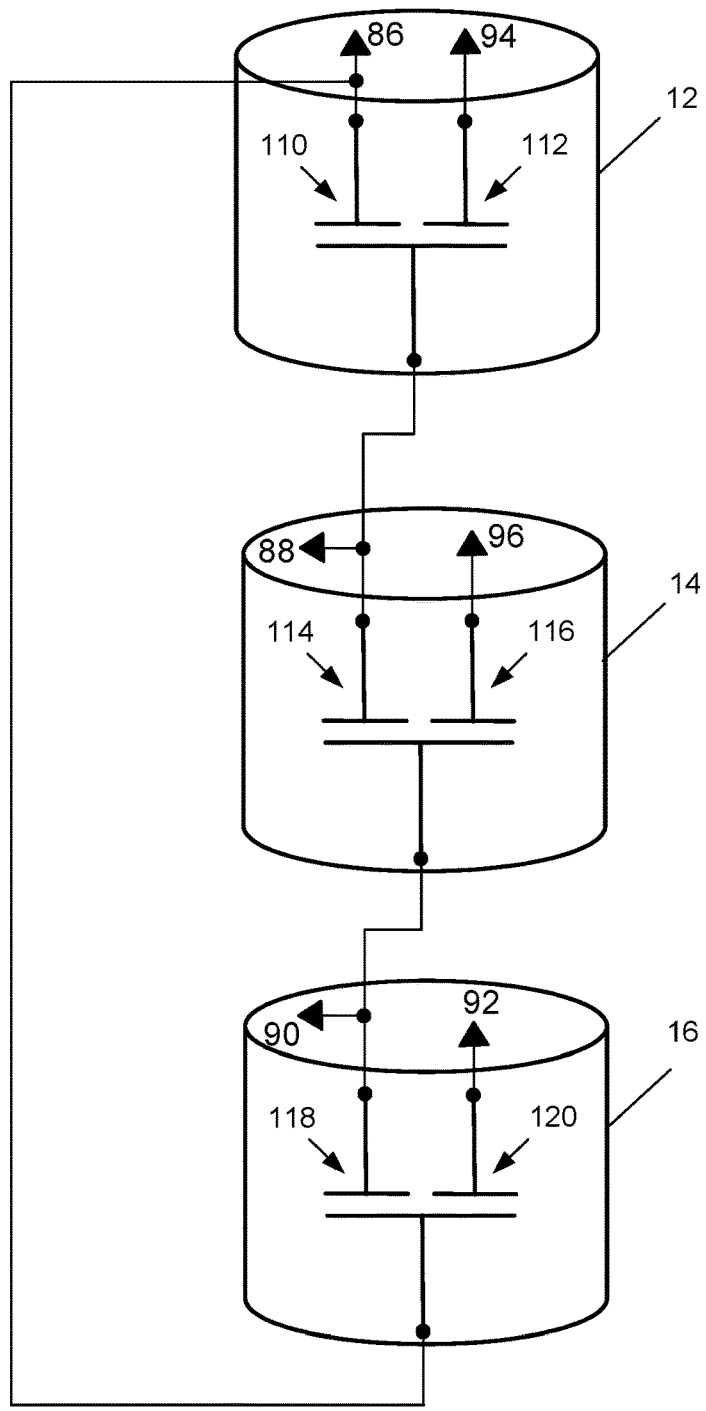
FIG. 7 is a schematic diagram of the three capacitive elements included in the adjustable power factor correction capacitor of FIG. 1.

Referring to FIG. 7, an electrical schematic of the three capacitive elements 12, 14, 16 as stacked in the adjustable power factor correction capacitor 10 is presented. As described above, each capacitive element includes two capacitors that share a common plate. As illustrated in the figure, each capacitor is represented with a capacitor symbol that shares a common electrode with a companion capacitor also formed in the corresponding capacitive element. In particular, capacitive element 12 includes capacitors 110 and 112, capacitive element 14 includes capacitors 114 and 116, and capacitive element 16 includes capacitors 118 and 120. While this particular arrangement provides two capacitor sections in each capacitive element, as indicated with the two capacitor symbols overlaying each of the three capacitive elements, each of the capacitive elements may be produced with more or less capacitors.

As schematically provided by the figure, in combination, one capacitor (e.g., capacitors 110, 114, 118) from each of the capacitive elements 12, 14, 16 is connected to form a delta configuration while the corresponding companion capacitor (e.g., capacitors 112, 116, 120) is not connected into the delta configuration. By allowing these companion capacitors to be selectively connected into the delta configuration, one or more parameters (e.g., capacitance value, KVAR, etc.) of the power factor correction can be adjusted, thereby providing additional functionality to the power factor correction capacitor 10 (e.g., the KVAR provided by the single device can be changed). Along with illustrating the delta configuration formed by the connected capacitors from each capacitive element, the figure provides a correspondence between the connections between the capacitors (of the capacitive elements) and the cover terminals of the power factor correction capacitor 10. In particular, and with reference to FIG. 6, the capacitors 110 and 112 of capacitive element 12 are respectively connected to cover terminal 86 and cover terminal 94. Capacitors 114 and 116 are respectively connected to cover terminal 88 and 96, and, capacitors 118 and 120 are respectively connected to cover terminals 90 and 92. Also with reference to FIG. 6, for each of the capacitive elements 12, 14, 16, each has one capacitor that is connected to one cover terminal that emerges from the common insulation barrier 98 (e.g., cover terminals 86, 88 and 90) and one capacitor that is connected to a cover terminal that emerges from one of the separate insulation barriers (e.g., cover terminal 94 emerges from insulation barrier 104, cover terminal 96 emerges from insulation barrier 102, and cover terminal 92 emerges from insulation barrier 100). As such, in adjust the capacitance being provided by one of the capacitive elements, e.g., by connecting the corresponding two capacitors of the element in parallel, an electrical connection needs to be established between one cover terminal that emerges from the common insulation barrier 98 (e.g., cover terminal 86 for capacitor 110) and the corresponding cover terminal that emerges from a separate insulation barrier (e.g., cover terminal 94 that emerges from insulation barrier 104 for capacitor 112).

By connecting the capacitive elements into a delta configuration, the power factor correction capacitor 10 is able to provide reactive power to a three-phase electrical system such as a three-phase electrical power system. In general, by connecting the capacitive elements into a delta configuration, three-phase power with a single voltage magnitude can be delivered to a load. In some arrangements, other configurations may be used for connecting the capacitive elements of the power factor correction capacitor 10. For example, the capacitive elements may be connected in a wye, star or other type of configuration that may allow the use of two voltages for the three phases.

Figure 8:
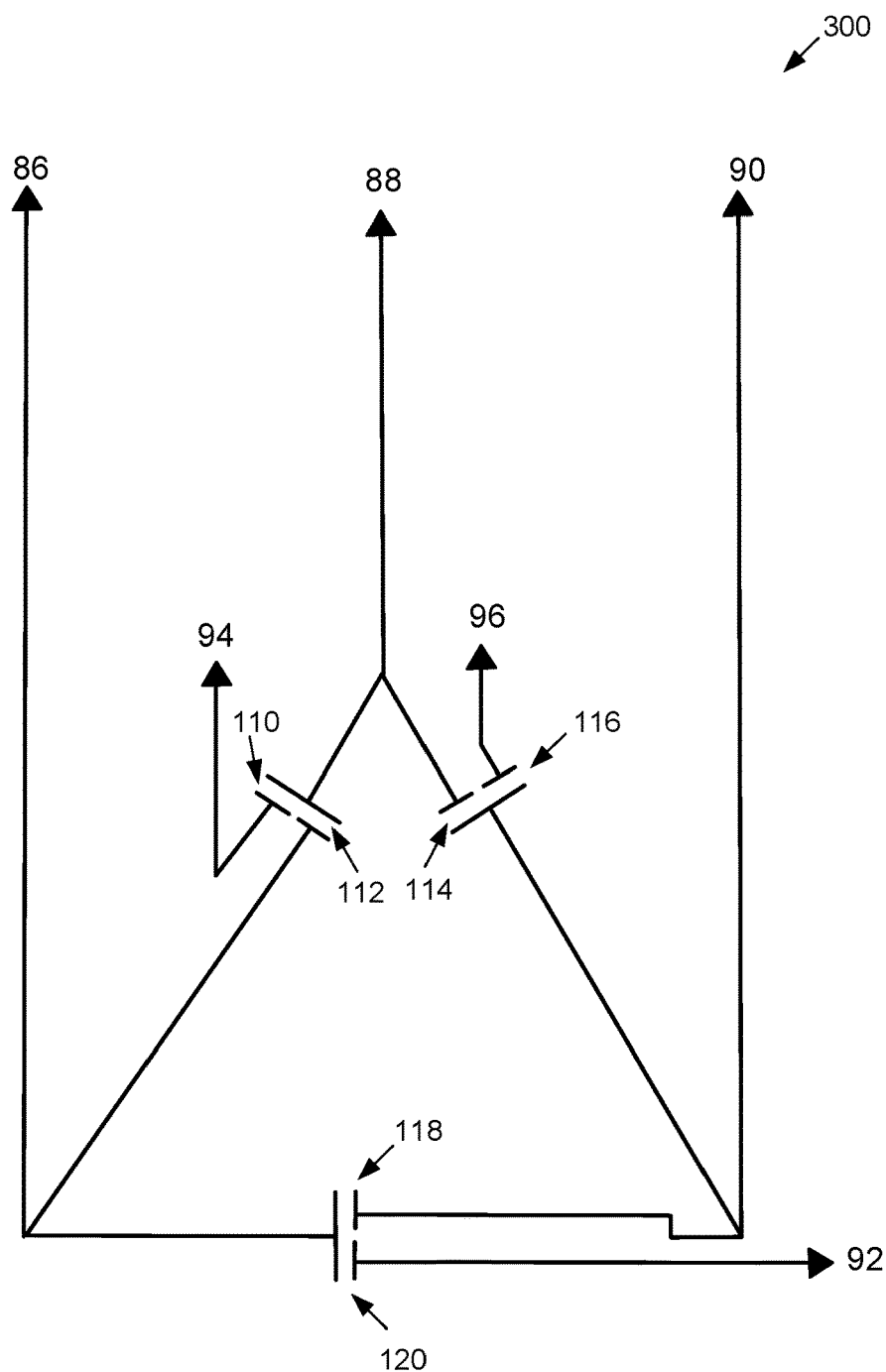
FIGS. 8 and 9 are schematic diagrams illustrating selectable adjustments to the connections of the capacitive elements included in the adjustable power factor correction capacitor of FIG. 1.

Referring to FIG. 8, a schematic diagram 300 is presented that represents the capacitors of the three capacitive elements 12, 14, and 16 (shown in FIG. 7). Along with the individual capacitors 110, 112, 114, 116, 118, 120 the diagram 300 also schematically represents the cover terminals 86, 88, 90, 92, 94, 96 and the corresponding connections to the capacitors. With reference to FIG. 7, capacitors 112, 114 and 118 are connected in a delta configuration while one electrode of each of the companion capacitors 110, 116 and 120 are simply connected to cover terminals and do not connect to the circuit. As such, the delta configuration only includes the capacitances of the connected capacitors 112, 114 and 118, which alone factor into defining the operating parameters of the power factor correction capacitor 10 (i.e., not connected into the delta configuration, the capacitances of capacitors 110, 116 and 120 do not factor into defining the parameters of the power factor correction capacitor).

In the illustrated example, each of the capacitors 112, 114 and 118 connected into the delta configuration have equivalent capacitance values. For example, and for demonstrative purposes, each capacitance value may be 38 microfarads for each of the capacitors 112, 114, 118. Based upon this capacitance value and other demonstrative parameters (e.g., a voltage of 480 volts, an operating frequency of 60 Hz), a 10 KVAR reactive power is provided by the power factor correction capacitor 10. With reference to equations (1) and (2), by increasing the capacitance value, the reactive power proportionally increases. As such, by increasing the capacitance values of the capacitors connected to form the delta configuration, the KVAR value provided by the power factor correction capacitor 10 correspondingly increases. For one technique to increase the capacitance values, additional capacitance may be connected in parallel with each capacitor that forms the delta configuration. For example, in this arrangement, the corresponding companion capacitor may be connected in parallel to the capacitor that is connected to form the delta configuration.

Figure 9:
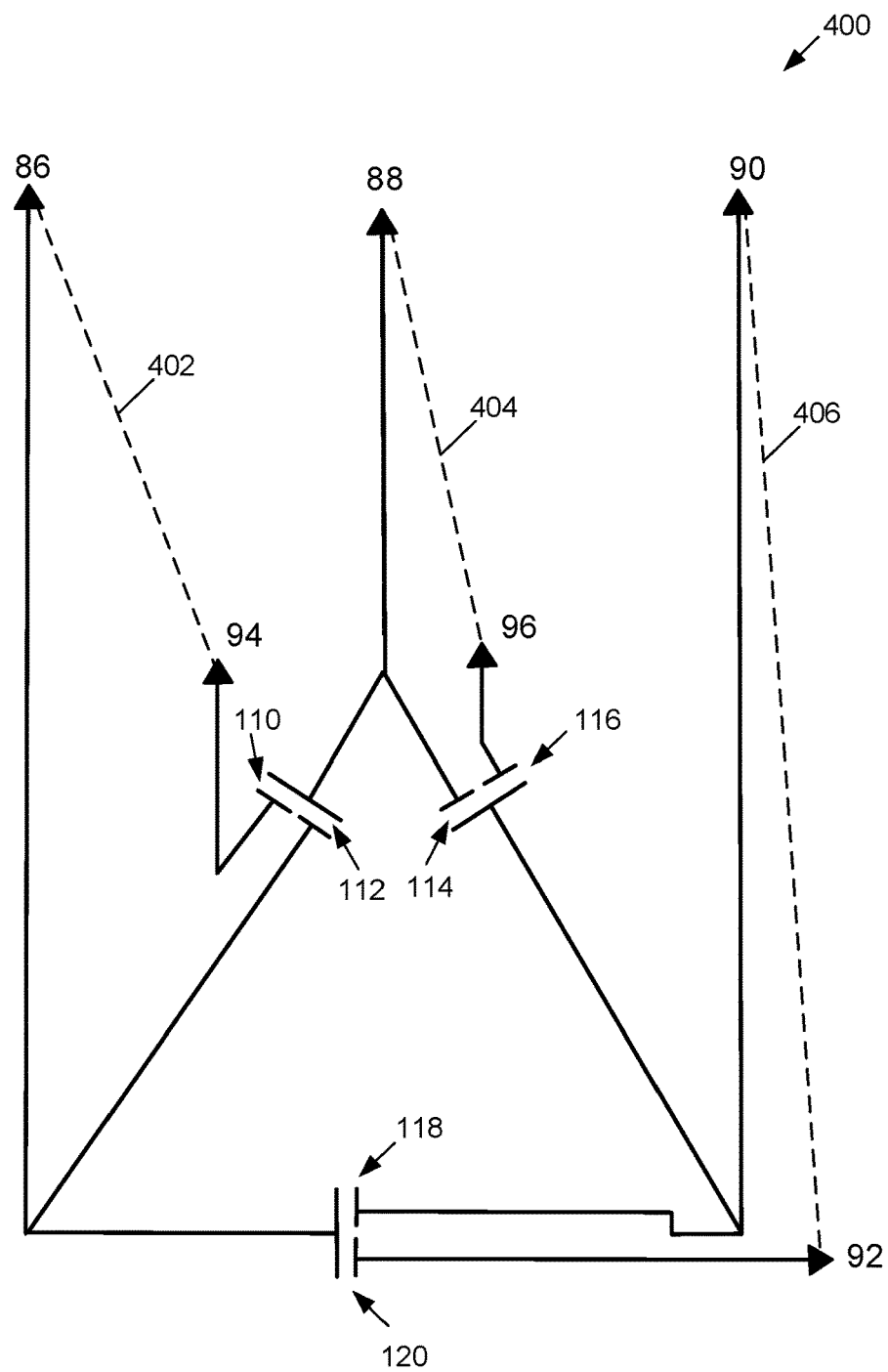

Referring to FIG. 9, a schematic diagram 400 is presented that represents connecting the respective companion capacitors in parallel to increase the capacitance values included in the delta configuration and correspondingly increase the KVAR value provided by the power factor correction capacitor 10. As represented by three dashed lines 402, 404 and 406, each of the capacitors 112, 114, 118 are connected in parallel with their corresponding companion capacitor 110, 116 or 118 of the respective capacitive elements 12, 14 and 16. In particular, dashed line 402 represents capacitor 110 being connected in parallel with capacitor 112; dashed line 404 represents capacitor 114 being connected in parallel with capacitor 116; and dashed line 406 represents capacitor 118 being connected in parallel with capacitor 120. The companion capacitors may or may not have capacitance values that are equivalent to capacitors already connected into the delta configuration. In this arrangement and for demonstrative purposes, each of the companion capacitor sections 110, 116 and 120 have equivalent capacitance values (e.g., 38 microfarads) that are also equivalent to the capacitance values (e.g., 38 microfarads) of the capacitors 112, 114, 118 connected in the delta configuration. Based on these parallel connections, each capacitive element 12, 14, 16 now provides a capacitance value of 76 microfarads (i.e., 38 microfarads plus 38 microfarads in parallel) to the delta configuration. Correspondingly, for a voltage of 480 volts AC and an operating frequency of 60 Hz, the reactive power rating of the power factor correction capacitor 10 increases to 20 KVAR. In the figure, the dashed lines 402, 404 and 406 represent the electrical connections needed to connect the respective capacitors in parallel. One or more techniques may be implemented for forming such connections. For example, such connections may be formed by using the cover terminals located on the assembly cover 80 of the power factor correction capacitor 10.

Figure 10:
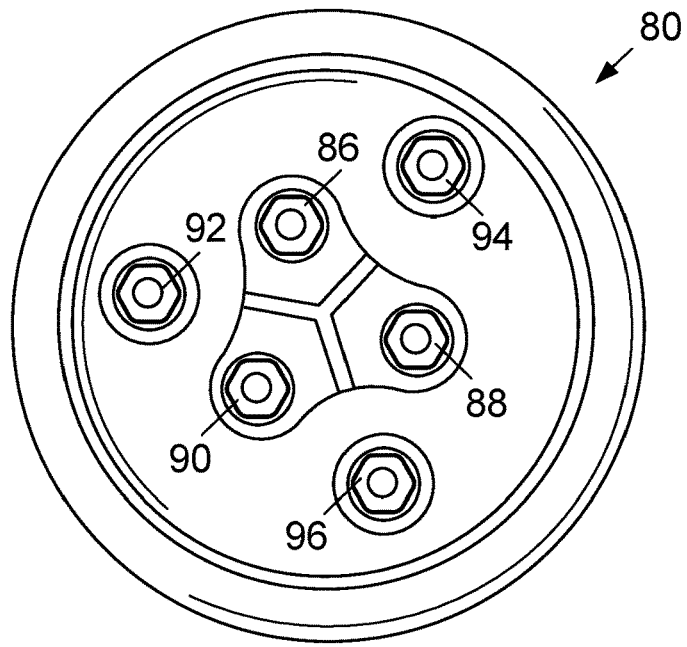
FIG. 10 is a top view of the cover assembly of FIG. 6.
Figure 11:
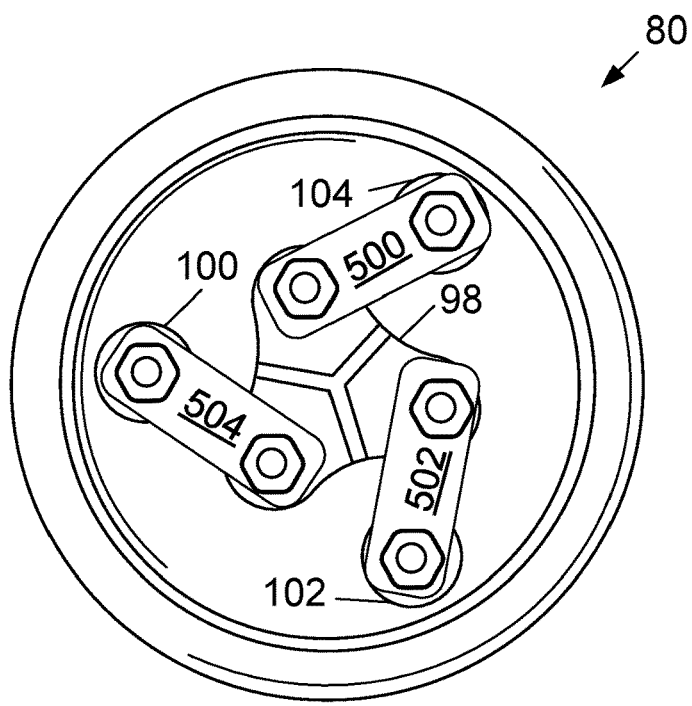
FIG. 11 is a top view of the cover assembly of FIG. 6, including conductive connectors.

Referring to FIGS. 10 and 11, top views of the cover assembly 80 (shown in FIG. 6) and the cover terminals are presented. In general, these two figures demonstrate how the cover terminals 86, 88, 90, 92, 94 and 96 can be used to form electrical connections to change capacitance values of three capacitive elements 12, 14 and 16 included in the power factor correction capacitor 10. For example, with reference to FIG. 10, none of the six cover terminals are illustrated as being electrically connected, as such, the delta configuration (as shown in schematic diagram of 300 of FIG. 8) is formed by only one capacitor (e.g., capacitors 112, 114 and 118) from each of the three capacitive elements 12, 14 and 16. Correspondingly, terminal cover terminals 86, 88 and 90 are connected into the delta configuration and using the example provided, the power factor correction capacitor 10 provides 10 KVAR by using three capacitance values each of 38 microfarads with a voltage of 480 volts AC at an operating frequency of 60 Hz.

Referring to FIG. 11, electrical connections are formed between pairs of cover terminals to adjust the KVAR provided by the power factor correction capacitor 10. By connecting these cover terminal pairs, corresponding pairs of capacitors (of the capacitive elements 12, 14 and 16) are connected in parallel to increase the capacitance values and thereby increase the KVAR of the power factor correction capacitor 10. As illustrated in the figure, one conductor (e.g., conductive plate 500) forms an electrical connection between cover terminal 86 and cover terminal 94. Similarly, a second conductor (e.g., conductive plate 502) forms an electrical connection between cover terminal 88 and cover terminal 96, and a third conductor (e.g., conductive plate 504) forms an electrical connection between the cover terminal 90 and 92. With reference to FIG. 9, by using these three conductors to establish connections, each pair of capacitors (e.g., capacitors 110 and 112; capacitors 114 and 116; capacitors 118 and 120) of the three capacitive elements 12, 14, 16 are connected. Through these connections, and as shown in the schematic diagram 400 of FIG. 9, each corresponding pair of capacitors is connected in parallel to combine the individual capacitance values. For example, the 38 microfarad capacitance of capacitor 110 is connected in parallel with the 38 microfarad capacitance of capacitor 112 to form a capacitance value of 76 microfarads. Through this increase in capacitance value for each of the capacitive elements 12, 14, and 16 connected to form the delta configuration, the reactive power provided by the power factor correction capacitor 10 increases from 10 KVAR to 20 KVAR for an applied voltage of 480 volts AC with an operating frequency of 60 Hz. Similar to these capacitance values being provided for demonstrative purposes, which may be changed for other applications, other parameters associated with the power factor correction capacitor 10 may be changed. For example, larger or smaller KVAR ratings may be provided by similar power factor correction capacitors that implement these techniques. Differentials between the KVAR ratings provided by the power factor correction capacitor 10 may also vary. For example, rather than doubling the KVAR values (e.g., from 10 KVAR to 20 KVAR), larger or smaller differentials may be designed (e.g., a power factor correction capacitor provides 10 KVAR or 15 KVAR). Different voltages (e.g., 240 volts AC), voltage ranges (e.g., 240-525 volts AC), operating frequencies (e.g., 50 Hz, 120 Hz, etc.), frequency ranges, etc. may be used by similar power factor correction capacitors that are capable of adjusting their parameters such as KVAR values. Further, in this particular example, three capacitive elements 12, 14 and 16 are included in the power factor correction capacitor 10; however in some arrangements more or less capacitive elements may be included. Similarly, each capacitive element includes two capacitors in the demonstrated example. However, in some arrangements more or less capacitors may be included in each of the capacitive elements. Also, along with implementing substantially similar capacitive elements (e.g., such as capacitive elements 12, 14 and 16), in some arrangement different elements may be implemented. For example, some of the capacitive elements may include one number of capacitors (e.g., two capacitors) while other capacitive elements may include another number of capacitors (e.g., four, six, eight capacitors). Further the techniques implemented to produce the capacitive elements and components thereof may vary for different types of power factor correction capacitors. Such variations to the capacitive elements may correspondingly call for adjustments to the number of cover terminals present on the cover assembly of a power factor correction capacitor.

Referring again to FIG. 11, one or more type of devices and construction techniques may be implemented connecting the cover terminals. In the illustrated example, the connections are provided by metallic plates that have through-holes located at their ends for being bolted onto the cover terminals (e.g., with one or nuts, washers, etc.). With reference to FIG. 6, in some arrangements the cover terminals may be provided by threaded bolts, screws, etc. capable of being inserted through one of the holes of the metallic plates. To assist a technician with properly connecting the appropriate cover terminals, different sized holes in may be drilled into the end of the metallic plates. For example, threaded bolts that emerge from the common isolation barrier 98 may each have one diameter (e.g., ¼ inch) while the threaded bolts that emerge from each of the separate isolation barriers 100, 102, 104 may have a second diameter (e.g., 5/16 inch). Correspondingly, each metallic plate may have one hole size (e.g., ¼ inch diameter) at one end of the plate and the other hole size (e.g., 5/16 inch) at the opposing end of the plate. By implementing such a mechanical key (e.g., by using two different hole sizes), the probability is reduced for a technician to improperly connect two of the cover terminals (e.g., two cover terminals that both emerge from the common isolation barrier 98). Along with using other types of mechanical keying techniques to reduce improperly connecting capacitors, capacitive elements, etc., other guidance techniques may be implemented. For example, color coding of the metallic plates (or other types of connectors), the cover terminals, etc. may be utilized to reduce improper connections and wiring by a technician.

In some arrangements other functionality may be incorporated into the power factor correction capacitor 10. For example, as is known in the art, there are occasional failures of capacitive elements made of wound metalized polymer film. If the capacitive element fails, it may do so in a sudden and violent manner, producing heat and outgassing such that high internal pressures are developed within the housing. Pressure responsive interrupter systems allow the connection between the capacitive element and the cover terminals to break in response to the high internal pressure, thereby removing the capacitive element from a circuit and stopping the high heat and overpressure condition within the housing before the housing ruptures. Such pressure interrupter systems may be incorporated in to the power factor correction capacitor 10.

In general, a pressure interrupter cover assembly can provide such protection for the capacitor 10 and its capacitive elements 12, 14, 16. During a failure event, outgassing may cause the circular cover to deform upwardly into a generally domed shape. When the cover deforms in the manner shown, the terminal posts are also displaced upwardly from the disconnect plate, and the electrical connection (e.g., formed by foil leads, foil tabs, etc.) with one of the capacitive elements can break.

It should be noted that although it is desirable that the connections of the capacitive elements and all cover terminals break, it is not necessary that they all do so in order to disconnect the capacitive elements from a circuit. For all instances in which the power factor correction capacitor 10 is used with its capacitors connected individually or in parallel, only a sufficient number of the terminal posts may need to be disconnected in order to remove the capacitive elements from the circuit. Locating the cover terminals that emerge from the common insulation barrier 98 generally in the center of the cover 82, where the deformation of the cover 82 may be the greatest, may ensures that these connections break first and with certainty in the event of a failure of any of the capacitive elements.

Other aspects of the design may be pertinent to the performance of the pressure interrupter system. For example, the structural aspects of connections to the cover terminals and terminal posts (e.g., welded foil tabs being soldered to connect to wires) corresponding to the various capacitors may make a pressure interrupter cover assembly more responsive to failure of one or more of the capacitive elements. In particular, the solder and wire greatly enhance the rigidity of foil tabs wherein upon deformation of the cover, the terminal posts may break cleanly from the foil tabs instead of pulling the foil tabs partially before breaking the connection. Thus, the power factor correction capacitor 10, despite having cover terminals, is able to satisfy safety requirements for fluid-filled metalized film capacitors, which may be considered a substantial advance.

The power factor correction capacitors and the features thereof described above are believed to admirably achieve the objects of the invention and to provide a practical and valuable advance in the art by facilitating efficient replacement of failed capacitors. Those skilled in the art will appreciate that the foregoing description is illustrative and that various modifications may be made without departing from the spirit and scope of the invention, which is defined in the following claims.

What is claimed is:

1. An apparatus comprising:
    a case configured to receive a plurality of capacitive elements, each capacitive element having at least two capacitors, each capacitor having a capacitive value; and
    a cover assembly with a peripheral edge secured to the case, the cover assembly comprising:
        for each of the plurality of capacitive elements, a first cover terminal that extends upwardly from the cover assembly, wherein each first cover terminal is connected to one of the at least two capacitors of the respective one of the plurality of capacitive elements,
        for each of the plurality of capacitive elements, a second cover terminal that extends upwardly from the cover assembly at a position spaced apart from the first cover terminal, wherein each second cover terminal at the spaced apart position is connected to another of the at least two capacitors for the respective one of the plurality of capacitive elements,
        a common insulation barrier mounted to the cover assembly, wherein one of the first cover terminals that extends upwardly from the cover assembly extends through the common insulation barrier, the common insulation barrier including barrier fins extending radially outwards, and
        a separate insulation barrier mounted to the cover assembly, wherein one of the second cover terminals that extends upwardly from the cover assembly at the spaced apart position extends through the separate insulation barrier.

2. The apparatus of claim 1, wherein the at least two capacitors for at least one of the plurality of capacitive elements have different capacitive values.

3. The apparatus of claim 1, wherein the at least two capacitors for each of the plurality of capacitive elements have equivalent capacitive values.

4. The apparatus of claim 1, wherein each of the plurality of capacitive elements comprises a cylindrically wound capacitive element.

5. The apparatus of claim 1, further comprising an insulating fluid in the case at least partially surrounding the plurality of capacitive elements.

6. The apparatus of claim 1, wherein the first cover terminal that extends upwardly from the cover assembly has a first size and the second cover terminal that extends upwardly from the cover assembly at the spaced apart position has a second size that is different from the first size.

7. The apparatus of claim 6, wherein the first size is a first diameter and the second size is a second diameter.

8. The apparatus of claim 1, wherein at least some of the plurality of capacitive elements are connected in a delta configuration.

9. The apparatus of claim 1, wherein the at least two capacitors for at least one of the plurality of capacitive elements are connected in parallel by connecting the first cover terminal that extends upwardly from the cover assembly and the second cover terminal that extends upwardly from the cover assembly at the spaced apart position.

10. The apparatus of claim 1, wherein the apparatus has a first KVAR value for the first cover terminal that extends upwardly from the cover assembly being disconnected from the second cover terminal that extends upwardly from the cover assembly at the spaced apart position.

11. The apparatus of claim 1, wherein the apparatus has a first KVAR value for the first cover terminal that extends upwardly from the cover assembly being disconnected from the second cover terminal that extends upwardly from the cover assembly at the spaced apart position, and the apparatus has a second KVAR value for the first cover terminal that extends upwardly from the cover assembly being connected to the second cover terminal that extends upwardly from the cover assembly at the spaced apart position.

12. The apparatus of claim 1, wherein both of the at least two capacitors of each of the plurality of capacitive elements have a capacitive value of between 19.0 microfarads and 76.0 microfarads.

13. The apparatus of claim 1, wherein the apparatus is configured to provide a selectable reactive power.

14. The apparatus of claim 13, wherein the selectable reactive power has a value of 10 KVAR or 20 KVAR.

15. The apparatus of claim 14, wherein the selectable reactive power has the value of 10 KVAR when first ones of the at least two capacitors of each of the plurality of capacitive elements are connected in a delta configuration.

16. The apparatus of claim 15, wherein the selectable reactive power has the value of 20 KVAR when the at least two capacitors of each of the plurality of capacitive elements are connected in parallel.

17. An apparatus comprising:
a case configured to receive a plurality of capacitive elements, each capacitive element having at least two capacitors, each capacitor having a capacitive value; and
a cover assembly with a peripheral edge secured to the case, the cover assembly comprising:
for each of the plurality of capacitive elements, a first cover terminal that extends upwardly from the cover assembly, wherein each first cover terminal is connected to one of the at least two capacitors of the respective one of the plurality of capacitive elements,
for each of the plurality of capacitive elements, a second cover terminal that extends upwardly from the cover assembly at a position spaced apart from the first cover terminal, wherein each second cover terminal at the spaced apart position is connected to another of the at least two capacitors for the respective one of the plurality of capacitive elements,
a common insulation barrier mounted to the cover assembly, wherein one of the first cover terminals that extends upwardly from the cover assembly extends through the common insulation barrier, the common insulation barrier including barrier fins extending radially outwards, and
a separate insulation barrier mounted to the cover assembly, wherein one of the second cover terminals that extends upwardly from the cover assembly at the spaced apart position extends through the separate insulation barrier;
wherein the apparatus has a first KVAR value when, for each of the plurality of capacitive elements, the first cover terminal is disconnected from the second cover terminal, and
wherein the apparatus has a second KVAR value when, for each of the plurality of capacitive elements, the first cover terminal is connected to the second cover terminal.

18. The apparatus of claim 17, wherein the at least two capacitors for at least one of the plurality of capacitive elements have different capacitive values.

19. The apparatus of claim 17, wherein the at least two capacitors for each of the plurality of capacitive elements have equivalent capacitive values.

20. The apparatus of claim 17, wherein each of the plurality of capacitive elements comprises a cylindrically wound capacitive element.

21. The apparatus of claim 17, further comprising an insulating fluid in the case at least partially surrounding the plurality of capacitive elements.

22. The apparatus of claim 17, wherein both of the at least two capacitors of each of the plurality of capacitive elements have a capacitive value of between 19.0 microfarads and 76.0 microfarads.

23. The apparatus of claim 17, wherein the apparatus is configured to provide a selectable reactive power.

24. The apparatus of claim 17, wherein the first KVAR value is 10 and the second KVAR value is 20.

25. The apparatus of claim 17, wherein the apparatus has the first KVAR value when first ones of the at least two capacitors of each of the plurality of capacitive elements are connected in a delta configuration.

26. The apparatus of claim 25, wherein the apparatus has the second KVAR value when the at least two capacitors of each of the plurality of capacitive elements are connected in parallel.

* * * * *